(12) United States Patent
Benoit et al.

(10) Patent No.: US 6,389,697 B1
(45) Date of Patent: May 21, 2002

(54) FABRICATING AUTOMOTIVE SPACEFRAMES USING ELECTROMAGNETIC FORMING OR MAGNETIC PULSE WELDING

(75) Inventors: Robert L. Benoit, Oakdale; Bernard I. Rachowitz, Lloyd Neck, both of NY (US)

(73) Assignee: Fuel Cell Components and Integrators, Inc., Hauppauge, NY (US)

( * ) Notice: Subject to any disclaimer, the term of this patent is extended or adjusted under 35 U.S.C. 154(b) by 10 days.

(21) Appl. No.: 09/617,733

(22) Filed: Jul. 17, 2000

(51) Int. Cl.⁷ .................................................. B21D 53/88
(52) U.S. Cl. .................. 29/897.2; 29/419.2; 29/525.14; 219/617
(58) Field of Search .................... 29/897.2, 897, 29/506, 518, 516, 520, 419.2, 505, 525.13, 450, 525.14, 511; 180/311; 280/781, 797, 798; 219/603, 617, 611; 72/56; 228/107; 403/171, 192, 218

(56) References Cited

U.S. PATENT DOCUMENTS

| | | | |
|---|---|---|---|
| 3,520,049 A | 7/1970 | Lysenko et al. | |
| 4,063,208 A | * 12/1977 | Bernatt | 72/56 |
| 4,150,274 A | * 4/1979 | Minin et al. | 219/611 |
| 4,355,844 A | * 10/1982 | Mazzarelli | 296/205 |
| 4,523,872 A | * 6/1985 | Arena et al. | 29/419.2 |
| 4,807,351 A | * 2/1989 | Berg et al. | 29/419.2 |
| 5,208,443 A | * 5/1993 | Mcgaffigan | 219/505 |
| 5,435,110 A | * 7/1995 | Stol et al. | 52/655.1 |
| 5,813,264 A | * 9/1998 | Steingroever | 72/56 |
| 5,966,813 A | 10/1999 | Durand | |
| 5,981,921 A | 11/1999 | Yablochnikov | |
| 6,137,094 A | * 10/2000 | Kistersky et al. | 219/603 |

* cited by examiner

Primary Examiner—P. W. Echols
Assistant Examiner—T. Nguyen
(74) Attorney, Agent, or Firm—Salzman & Levy

(57) ABSTRACT

A method for fabricating an automotive spaceframe using Electromagnetic Pulse Forming (EMF) or Magnetic Pulse Welding (MPW) techniques. The spaceframe can be either an all aluminum structure or a combination of dissimilar materials, such as aluminum and steel. The welding or forming methods can include the use of split coils or split inductors that allow for ease of access to the joints to be bonded in the spaceframe.

17 Claims, 5 Drawing Sheets

Electromagnetically Formed Joint

FABRICATING AUTOMOTIVE SPACEFRAMES USING ELECTROMAGNETIC FORMING OR MAGNETIC PULSE WELDING

FIELD OF THE INVENTION

The present invention relates to automotive spaceframes and, more particularly, to a method and apparatus for constructing spaceframes by Electromagnetic Pulse Forming (EMF) or Magnetic Pulse Welding (MPW).

BACKGROUND OF THE INVENTION

The most efficient method, from a cost and weight standpoint, of fabricating an automotive structure is to first construct an inner skeletal structure called a spaceframe. The outer body panels are then attached to the spaceframe, via welding, structural bonding, or other methods. The outer body panels, such as the front and rear fenders, roof, etc., most often have been attached by conventional welding techniques.

Most, if not all, aluminum spaceframes have been constructed using these conventional welding techniques, as can be observed in the fabricating process used to construct the Audi A8 automobile.

An economical method of constructing such a spaceframe is to fixture cast aluminum fittings, often referred to as "nodes". To these fixtured nodes, closed section members are assembled. The closed section members can be extruded, drawn, or seam welded.

One drawback of using conventional welding for spaceframes, particularly those made of aluminum, is the inherent distortion, caused by the heat generated in the welding process. This is true even when fixtures are used at key positions of the spaceframe to brace the parts against the distortion. The fixturing is only partially successful, because once the spaceframe is removed from the fixture, it will nevertheless become distorted from induced residual stresses. The distorted frame will then require straightening, which is both expensive and labor intensive.

Another drawback of the welding process is the weakening of the spaceframe by the generated heat required for the welding, which anneals the aluminum material in the "heat affected zone". Unfortunately, these heat affected zones are those areas that are often subjected to the highest mechanical stresses.

In order to correct for this, additional aluminum material is often added to strengthen the structure in the welded joint area. This is not a good solution to the problem, however, because the additional materials increase the cost and weight of the finished vehicle.

Still another drawback of the spaceframe design that employs conventional welding techniques is that aluminum cannot be welded to steel. One solution for attaching aluminum to steel is the use of electromagnetic force. The force is applied to a steel band that is fitted over the dissimilar components of a frame coupling, as is illustrated in U.S. Pat. No. 5,966,813, issued to Durand, on Oct. 19, 1999, for a METHOD FOR JOINING VEHICLE FRAME COMPONENTS. The band is caused to distort under the applied electromagnetic forces, and bond the frame components together.

The use of Electromagnetic Pulse Forming (EMF) or Magnetic Pulse Welding (MPW) eliminates the aforementioned drawbacks of conventionally welded spaceframe construction. There is no heat inherent in either process, so that the need to fixture and straighten the joined components after assembly is eliminated.

There are several drawbacks in the above mentioned Durand process, one of which is the use of a steel band. The band adds to the cost and complexity of the welding process, and does not provide a strong bond between the parts themselves. The use of a thin band does not provide sufficient mechanical strength for joining areas subject to high stress.

In a second instance, placing the band at the areas to be joined is cumbersome, and does not lend itself to fabricating the spaceframe along mass-production assembly lines. The electromagnetic coils providing the electromagnetic force for forming the band cannot be removed from, or negotiated about many of the joined areas along the frame. Thus, the Durand process would not easily conform to current automotive assembly line, mass production techniques.

The use of only dissimilar materials in the Durand process is also a drawback, since automobiles like the Audi A8 use an entire aluminum spaceframe.

A process described in U.S. Pat. No. 3,520,049 to Lysenko et al, which is referred to as Magnetic Pulse Welding (MPW) is similar to EMF, wherein magnetic fields induced by high electrical currents are used to join the materials. In the case of MPW, higher forces are generated and the materials are molecularly welded together. A torque-carrying MPW joint is shorter and therefore lighter than an equivalent performance EMF joint.

In the MPW process, precise positioning of the components is required to produce a consistent weld. A loose fit between the components, as described in U.S. Pat. No. 5,981,921, requires accurate tooling to support the individual components to be welded. The described invention precisely aligns and positions the parts relative to each other without external holding fixtures, thus ensuring a high quality weld.

The present invention seeks to overcome the many drawbacks of the above processes. The current invention uses a split coil. This allows the apparatus to be positioned and removed along the automotive assembly line. Owing to the fact that a spaceframe is a closed structure, a split coil (EMF) or split inductor (MPW) is required to install and remove the forming device before and after the assembly process.

The invention does not require a band to join the frame members. Rather, the inventive process uses undercuts and raised lands along the surface of the parts, in order to more securely join them together. In addition, the present process can be used for both similar and dissimilar materials. Furthermore, the present process fabricates a much stronger weld, wherein, in the joined area, the parts actually fuse together at the molecular level.

The invention allows for permanently joining aluminum to steel, provided that considerations are made to properly protect the interface between the aluminum and steel from corrosion due to galvanic action, as may occur to dissimilar metals. These concerns are easily addressed using conventional painting or sealing techniques in the joint areas.

Further, the process of this invention is capable of assembling aluminum members to nodes made of injection molded high performance composite plastic material which further reduces cost and weight, while eliminating concerns of galvanic corrosion.

SUMMARY OF THE INVENTION

In accordance with the present invention, there is provided a method of manufacturing an automotive inner-skeletal structure, commonly referred to as a "Spaceframe", using Electromagnetic Pulse Forming (EMF) or Magnetic Pulse Welding (MPW) techniques. The spaceframe can comprise either an all aluminum structure, or a combination of dissimilar materials, such as aluminum and steel. The spaceframe can comprise cast aluminum nodes that are fixtured. The nodes are designed to receive aluminum extruded, drawn, or seam welded closed members. The closed members are assembled to the protruding branches of the nodes. The nodes can also comprise high strength steel, stainless steel, titanium, or magnesium. The closed members can comprise aluminum and can surround protruding branches projecting from the nodes. The nodes are permanently joined to the branches using either an EMF or MPW process.

The nodes can additionally be made of plastic (non-metallic) material with connection branches, and the aluminum closed members can surround the connection branches. The closed member can be permanently joined to the connection branches using EMF. In at least a portion of the spaceframe, the branches of an aluminum node of the spaceframe can surround a steel connection member. The branch can be permanently attached to the steel member using either EMF or MPW. This would allow for the incorporation of one, or several, high strength steel members into a spaceframe that would otherwise consist of aluminum components.

The split coils and split inductors used to fabricate the spaceframe make mass production and assembly line techniques more feasible when using EMF and MPW. The split coils can be stationary, and the joints presented to them for assembly via a moving fixture; or the split coil or inductor can be moved to each joint of a stationary, pre-assembled spaceframe. NBG Technologies/TechnaPulse has successfully manufactured and tested split coils and split inductors and they are not the subject of this patent.

The nodes of the invention are fabricated with a combination of undercuts, or grooves, and raised surface lands. During pulse welding, the opposing structured surfaces bond together at a molecular level creating an exceptionally strong bond.

It is an object of the present invention to provide an improved automotive spaceframe fabrication method.

It is another object of this invention to provide a fabrication process for an automotive spaceframe that permanently attaches the nodes to the closed members by Magnetic Pulse Welding or Electromagnetic Pulse Forming.

It is a further object of the invention to provide a fabrication process for an automotive spaceframe that results in a stronger and lighter structure.

BRIEF DESCRIPTION OF THE DRAWINGS

A complete understanding of the present invention may be obtained by reference to the accompanying drawings, when considered in conjunction with the subsequent detailed description, in which.

For purposes of clarity and brevity, like elements and components shall bear the same designations and numbering throughout the figures.

DESCRIPTION OF THE PREFERRED EMBODIMENT

Generally speaking, the invention features a method for fabricating an automotive spaceframe, using Electromagnetic Pulse Forming (EMF) or Magnetic Pulse Welding (MPW) techniques. The spaceframe can comprise either an all aluminum structure or a combination of dissimilar materials, such as aluminum and steel.

Figure 1:
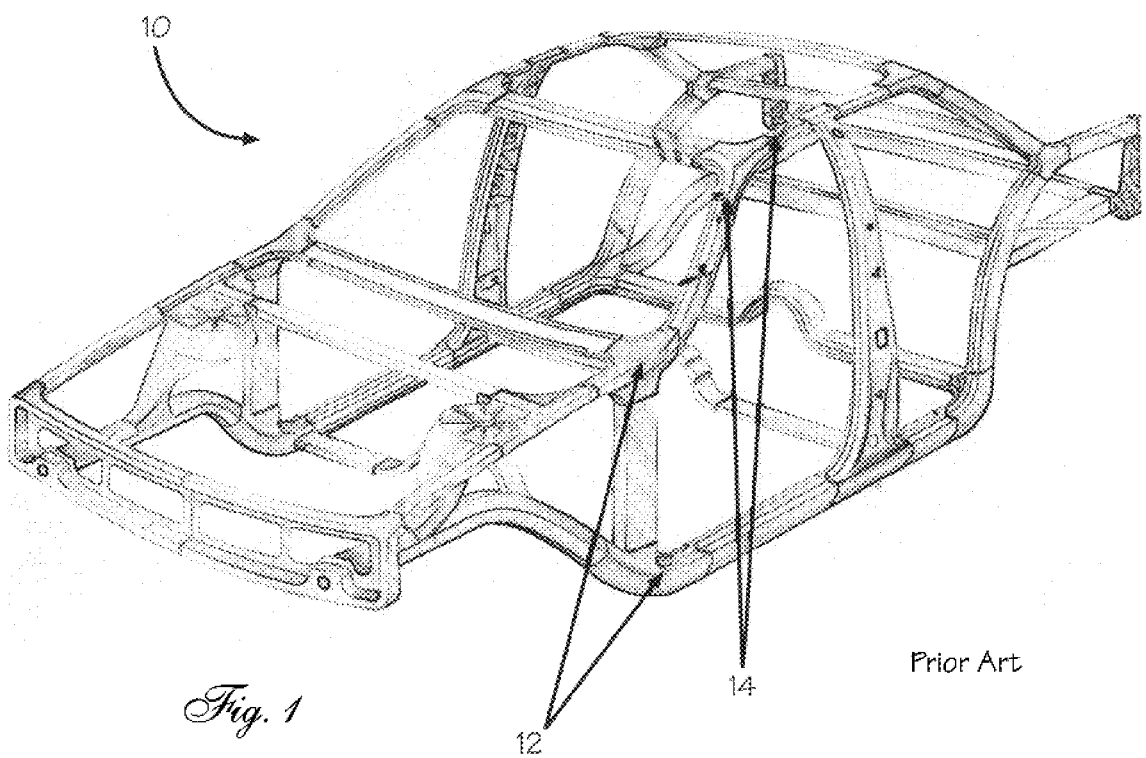
FIG. 1 illustrates a perspective view of a typical automotive spaceframe.
Figure 2:
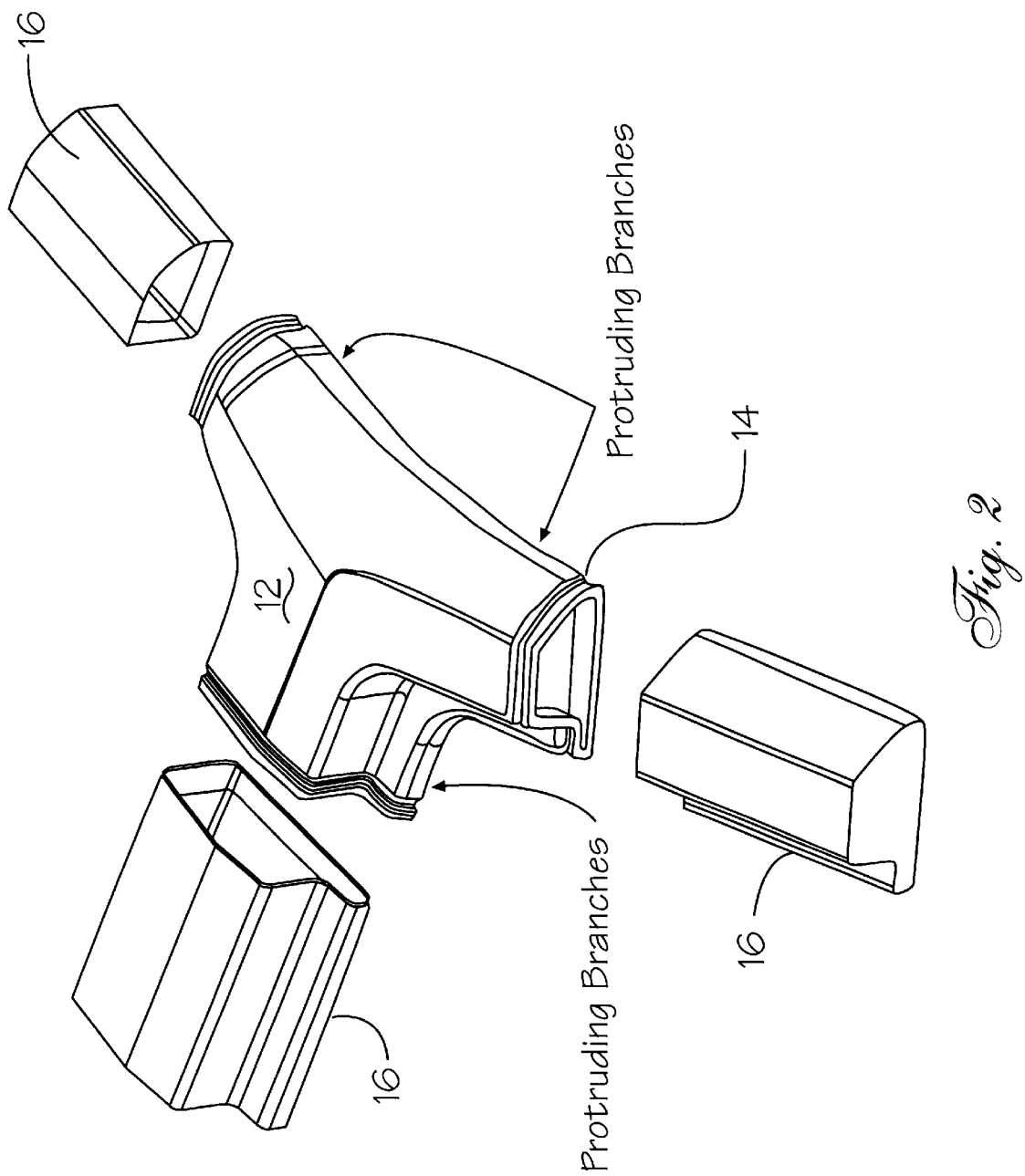
FIG. 2 depicts a perspective view of a joint of the spaceframe shown in FIG. 1, being fabricated in accordance with the method of this invention.

Now referring to FIG. 1, a typical automotive spaceframe 10 is illustrated. The automotive spaceframe 10 has aluminum cast nodes 12, which are typically arc welded at its joints 14. The joints 14 of the nodes 12, shown in greater detail in FIG. 2, are Magnetic Pulse Welded or Electromagnetically Pulse Formed to closed extruded aluminum members 16, in accordance with the method of this invention. The spaceframe 10 can comprise either an all aluminum structure or a combination of dissimilar materials, such as aluminum and steel. The spaceframe 10 can comprise cast aluminum nodes 12 that are fixtured. The nodes 12 are designed to receive aluminum extruded, drawn, or seam welded closed members 16. The closed members 16 are assembled to the protruding branches of the nodes 12. The nodes 12 can also comprise high strength steel, stainless steel, titanium, or magnesium.

The closed members 16 can comprise aluminum and can surround connection branches projecting from the spaceframe. The nodes 12 and are permanently joined to the branches using either an EMF or MPW process. The nodes 12 can additionally be made of plastic (non-metallic) material if the EMF process is utilized.

The EMF or MPW process uses split coils or split inductors, respectively, in order to be able to access the joints 14 on an automotive assembly line (i.e., to allow these units ingress and egress about their individual weld zones). The split coils can be stationary and the joints presented to them for assembly via a moving fixture; or the split coil or inductor can be moved to each joint of a stationary, pre-assembled spaceframe.

Figure 3:
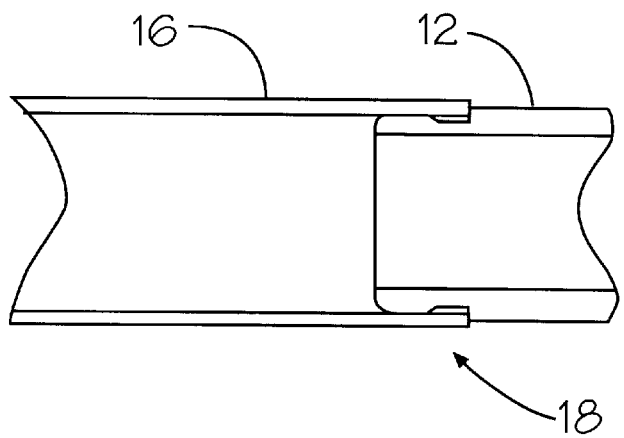
FIG. 3 shows a cut-away, sectional view of an extruded member and node of the joint depicted in FIG. 2, prior to Magnetic Pulse Welding.

Referring to FIG. 3, a pulse welded joint 18 in accordance with this invention is shown with the node 12 and the closed extruded member 16 held in contiguous relationship, prior to Magnetic Pulse Weld forming.

Figure 4:
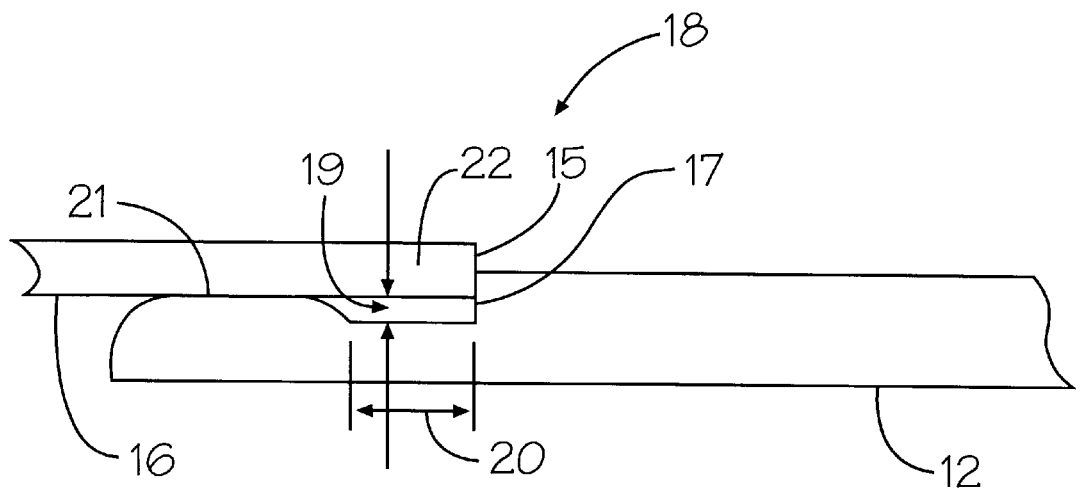
FIG. 4 illustrates an enlarged partial view of the joint shown in FIG. 3.

Referring to FIG. 4, the joint 18 is illustrated in enlarged, greater detail. The abutment end 15 of an end portion 22 of tubular, extruded member 16 is caused to abut against the stop 17 of node 12. Node 12 is provided with an undercut, groove, or preweld gap 19, and a raised land 21, defining a weld zone 20, as shown.

Figure 5:
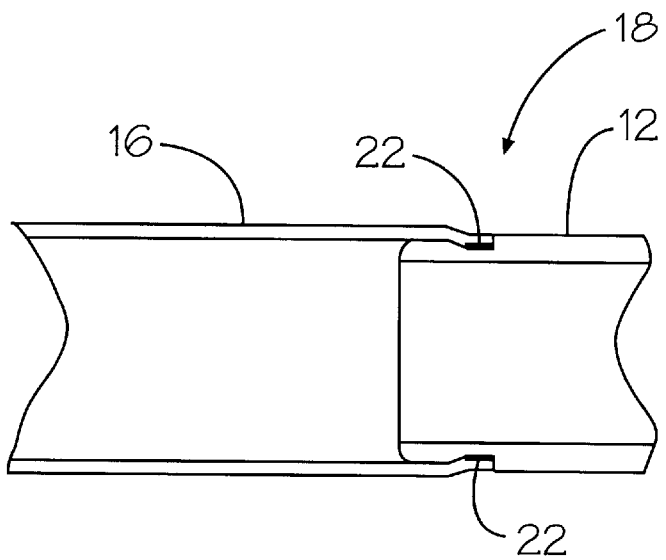
FIG. 5 depicts a cut-away, sectional view of an extruded member and node of the joint depicted in FIG. 2, after bonding by Magnetic Pulse Welding.

Referring to FIG. 5, the joint 18 with the node 12 and the closed extruded member 16 are illustrated after being joined or formed by Magnetic Pulse Welding.

Figure 6:
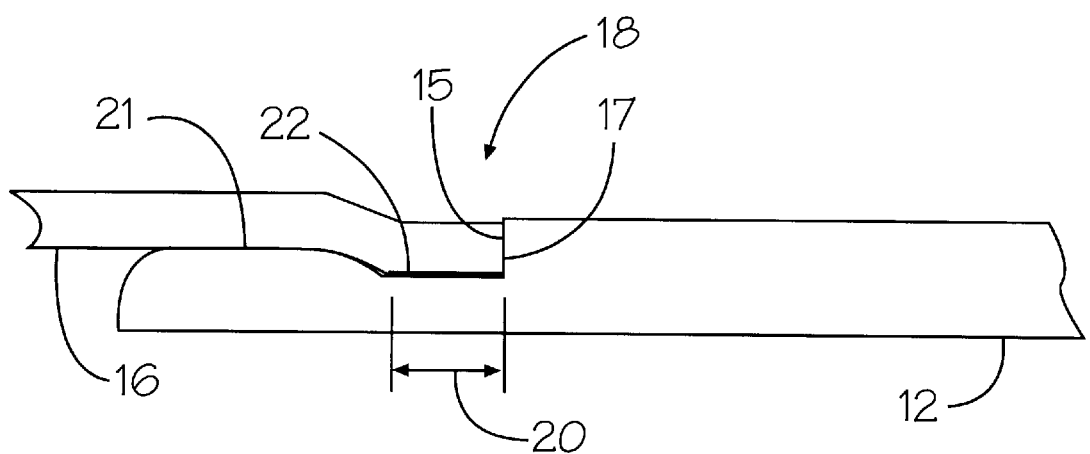
FIG. 6 illustrates an enlarged partial view of the joint shown in FIG. 5.

Referring to FIG. 6, the joint 18 is illustrated in enlarged, greater detail. It will be observed that the abutment end 15 of the end portion 22 of the extruded member 16 has been formed about the raised land 16, and has been forced inwardly against the tube stop 17, in order to fill the gap 19, and has become contiguous with the node 12 in the weld zone 20.

Figure 7:
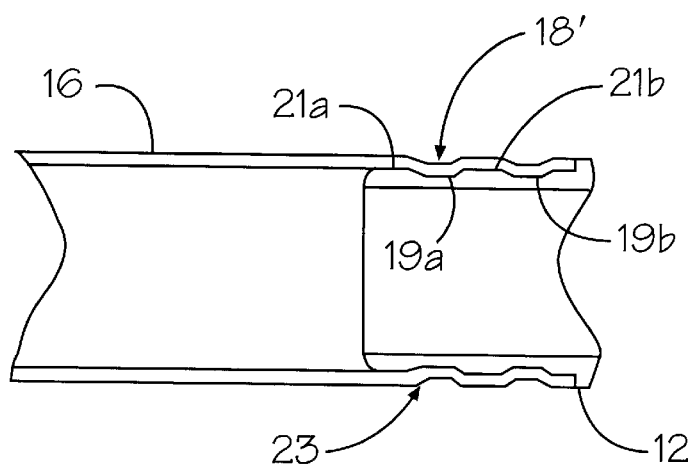
FIG. 7 shows a cut-away, sectional view of an extruded member and node of the joint depicted in FIG. 2, after bonding by Electromagnetic Pulse Forming.

Referring to FIG. 7, a slightly different joint configuration or groove profile 23 is shown for the electromagnetically pulse formed (EMF) joint 18'. The joint 18' with the node 12 and the closed extruded member 16 are illustrated after being joined or formed. Note that there are a pair of raised lands 21a and 21b, respectively, and a pair of respective gaps 19a and 19b, depicted in FIG. 7.

Figure 8:
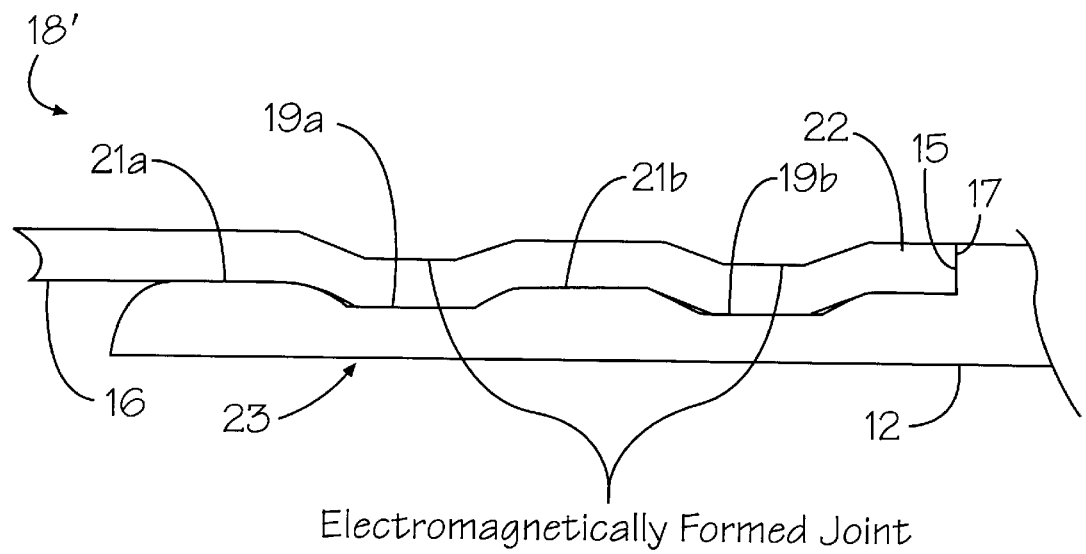
FIG. 8 illustrates an enlarged partial view of the joint shown in FIG. 7.

Referring to FIG. 8, the joint 18' is illustrated in enlarged, greater detail. It will be observed that the abutment end 15 of the end portion 22 of the extruded member 16 has been formed about the raised lands 21a and 21b, and has been forced inwardly against the tube stop 17, in order to fill the gaps 19a and 19b, and has become contiguous with the node 12 along groove profile 23 of the node.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of manufacturing an automotive inner-skeletal structure or "Spaceframe" having closed members and nodes defining joints of said spaceframe, said method of manufacturing using Electromagnetic Pulse Forming (EMF) or Magnetic Pulse Welding (MPW), and comprising the steps of:
   a) abutting a closed member against a stop of a node member of at least one joint, said node member having at least one raised land, and at least one undercut portion defining at least one gap between said closed member and said node prior to forming said closed member about said node; and
   b) placing at least one split inductor, or split coil adjacent said at least one joint; and
   c) forming said closed member about said node in order to close said at least one gap, using EMF or MPW via said split inductor or split coil, whereby at least one formed joint of said spaceframe is manufactured.

2. The method of manufacturing an automotive inner-skeletal structure or "Spaceframe" in accordance with claim 1, wherein said at least one closed member and said at least one node each respectively comprise aluminum.

3. The method of manufacturing an automotive inner-skeletal structure or "Spaceframe" in accordance with claim 1, wherein said at least one closed member and said at least one node respectively comprise a combination of aluminum and steel.

4. The method of manufacturing an automotive inner-skeletal structure or "Spaceframe" in accordance with claim 1, wherein said at least one node comprises cast aluminum, and further wherein said at least one node is fixtured.

5. The method of manufacturing an automotive inner-skeletal structure or "Spaceframe" in accordance with claim 1, wherein said at least one closed member is aluminum extruded, drawn, or seam welded.

6. The method of manufacturing an automotive inner-skeletal structure or "Spaceframe" in accordance with claim 1, wherein said at least one closed member is assembled to a branch of said at least one node.

7. The method of manufacturing an automotive inner-skeletal structure or "Spaceframe" in accordance with claim 1, wherein said at least one node is selected from a group of materials consisting of: steel, stainless steel, titanium, and magnesium.

8. The method of manufacturing an automotive inner-skeletal structure or "Spaceframe" in accordance with claim 1, wherein said spaceframe has a connection branch, and wherein said at least one closed member can comprise aluminum, and further wherein said at least one closed member is disposed adjacent said connection branch.

9. The method of manufacturing an automotive inner-skeletal structure or "Spaceframe" in accordance with claim 1, wherein said at least one node comprises plastic and a connection branch.

10. The method of manufacturing an automotive inner-skeletal structure or "Spaceframe" in accordance with claim 1, wherein said at least one node comprises non-metallic material with a connection branch.

11. The method of manufacturing an automotive inner-skeletal structure or "Spaceframe" in accordance with claim 9, wherein at least one aluminum closed member can surround the connection branch.

12. The method of manufacturing an automotive inner-skeletal structure or "Spaceframe" in accordance with claim 10, wherein at least one aluminum closed member can surround the connection branch.

13. The method of manufacturing an automotive inner-skeletal structure or "Spaceframe" in accordance with claim 9, wherein a branch of an aluminum node of the spaceframe, in at least a portion of the spaceframe, surrounds a steel connection member.

14. The method of manufacturing an automotive inner-skeletal structure or "Spaceframe" in accordance with claim 1, wherein a branch of an aluminum node of the spaceframe, in at least a portion of the spaceframe, surrounds a steel connection member.

15. The method of manufacturing an automotive inner-skeletal structure or "Spaceframe" in accordance with claim 1, wherein a split coil is maintained in a stationary position, while a joint is moved toward it for assembly.

16. The method of manufacturing an automotive inner-skeletal structure or "Spaceframe" in accordance with claim 1, wherein a split inductor is maintained in a stationary position, while a joint is moved toward it for assembly.

17. The method of manufacturing an automotive inner-skeletal structure or "Spaceframe" in accordance with claim 1, wherein said spaceframe is maintained stationary, and is at least partially pre-assembled.

* * * * *